J. F. WOLLENSAK & W. E. GILL.
OPEN CIRCUIT BATTERY.
No. 11,207. Reissued Dec. 1, 1891.
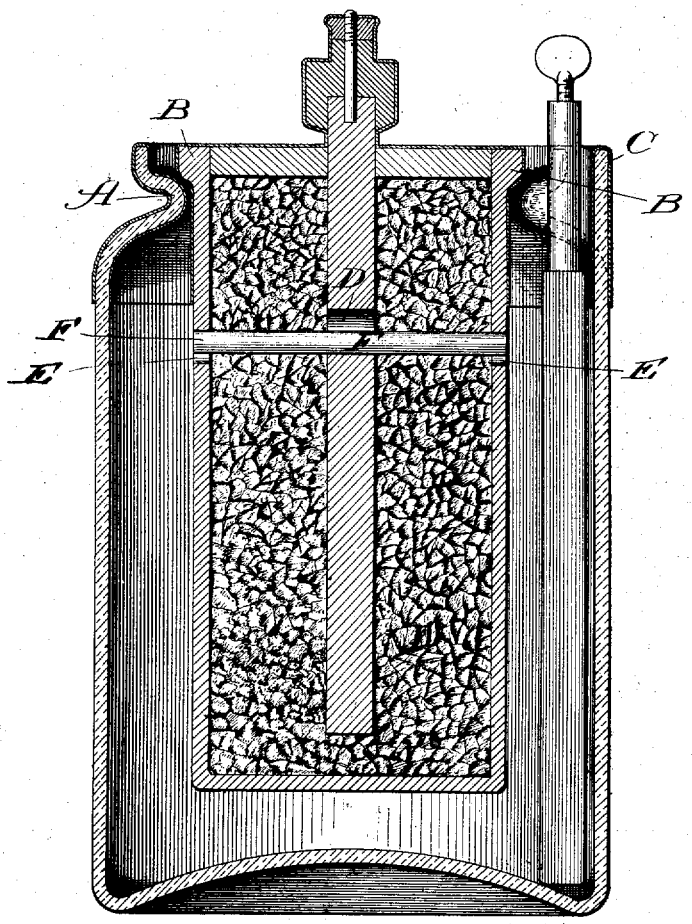
Witnesses:
Geo. Gaylord,
Clifford N. White
Inventors:
John F. Wollensak,
William E. Gill,
By Banning & Banning & Payne
Att'ys.

UNITED STATES PATENT OFFICE.

JOHN F. WOLLENSAK AND WILLIAM E. GILL, OF CHICAGO, ILLINOIS.

OPEN-CIRCUIT BATTERY.

SPECIFICATION forming part of Reissued Letters Patent No. 11,207, dated December 1, 1891.

Original No. 436,516, dated September 16, 1890. Application for reissue filed October 13, 1890. Serial No. 368,231.

*To all whom it may concern:*

Be it known that we, JOHN F. WOLLENSAK and WILLIAM E. GILL, citizens of the United States, residing at Chicago, Illinois, have invented certain new and useful Improvements in Open-Circuit Batteries, of which the following is a specification.

In the drawing we have represented a vertical longitudinal section of a jar and a porous cup containing granulated carbon suspended in the jar.

Heretofore it has been the general practice to set the porous cup containing the granulated carbon in the jar so that it rested upon the bottom of the same. The fluid with which the jar has been filled was thus prevented from flowing beneath the porous cup and acting upon it from the bottom as well as from the sides. It has also been a general practice to flow wax over the top of the porous cup to seal and close the same. The wax has been depended on to hold the carbon stick in position, and the head or end of the stick has usually been employed as a handle to lift the porous cup in and out of the jar. As it was held in place only by the wax, this would frequently be insufficient to sustain the weight of the porous cup, particularly when the porous cup becomes filled with the solution. The wax would break, the carbon stick pull out, and the cup be rendered practically worthless. We propose by our improvements to obviate both of these objections.

In making our improvements we provide a jar with an inwardly-projecting rim or flange A, which may extend entirely around the interior of the mouth of the jar and be formed as a part of it when the jar is made. The porous cup is made with a correspondingly outwardly-extending rim or flange B, which rests upon and fits against the inwardly-projecting rim of the jar. Of course at the place where the spout C is formed in the jar the rim A would be unnecessary and dispensed with. When the porous cup is arranged in the jar, it is suspended at a desired distance from the bottom and its outwardly-extending rim rests upon the inwardly-extending rim of the jar. This would permit the fluid with which the jar is filled to entirely surround the cup on all sides and at the bottom as well, so that its most advantageous and beneficial effects will be obtained.

The carbon stick is provided with a hole D, and the cup is also provided with holes E, corresponding to the hole in the carbon stick. In order to securely attach the carbon stick to the cup, a pin F of some non-conducting material, preferably wood, is inserted through the holes in the cup and the hole in the carbon stick, which are preferably made somewhat elongated to facilitate the insertion of the pin. The stick is then drawn up to its highest position and the wax poured over the top of the cup and of the carbon stick, as in the present jar. When the head or protruding end of the carbon stick is grasped and the cup lifted, the weight will of course be received by the pin instead of by the wax, so that all possibility of the breaking away of the wax and the ruin of the cup is obviated.

While we prefer the above construction, it is not in all cases essential to the operation of our invention that the pin F be made of non-conducting material.

What we regard as new, and desire to secure by Letters Patent, is—

1. In open-circuit batteries, the combination of a cup having holes through its sides, a carbon stick having a hole in a position and direction to be brought into a line with the holes in the cup, and a pin passing through the holes in the cup and stick, substantially as described.

2. In open-circuit batteries, the combination of a cup having holes through its sides, a carbon stick having a hole in a position and direction to be brought into a line with the holes in the cup, and a pin of non-conducting material passing through the holes in the cup and stick, substantially as described.

JOHN F. WOLLENSAK.
WILLIAM E. GILL.

Witnesses:
GEORGE S. PAYSON,
SAMUEL E. HIBBEN.